Sept. 25, 1928.                F. AESCHBACH                1,685,187
                    DOUGH KNEADING AND MIXING MACHINE
                Filed Jan. 12, 1928       2 Sheets-Sheet 1

INVENTOR:
Friedrich Aeschbach,
By Henry Ortty Jr
                Atty.

Sept. 25, 1928.  F. AESCHBACH  1,685,187
DOUGH KNEADING AND MIXING MACHINE
Filed Jan. 12, 1928  2 Sheets-Sheet 2

INVENTOR
Friedrich Aeschbach
att,

Patented Sept. 25, 1928.

1,685,187

UNITED STATES PATENT OFFICE.

FRIEDRICH AESCHBACH, OF AARAU, SWITZERLAND.

DOUGH KNEADING AND MIXING MACHINE.

Application filed January 12, 1928, Serial No. 246,271, and in Switzerland November 21, 1927.

The subject matter of the present invention is a dough kneading and mixing machine provided with means for lifting and tilting the kneading trough. According to the present invention the trough is turnably and removably mounted in an arm adapted to be turnable about a vertical axis, said arm carrying at the same time the device for lifting and tilting the trough.

A constructional example of the subject matter of the present invention is illustrated on the accompanying drawings, in which.

Figure 4:
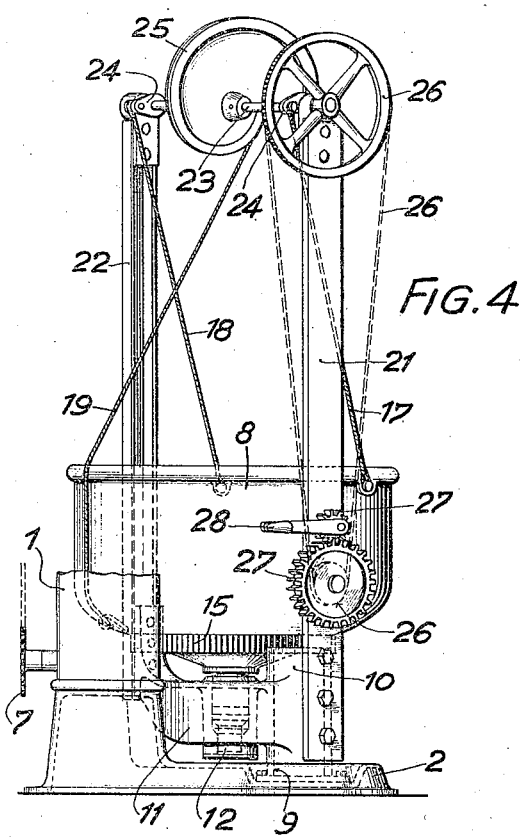
Fig. 4 shows in an elevation the lifting and tilting device with the trough in the working position, the other parts of the machine being broken away.
Figure 6:
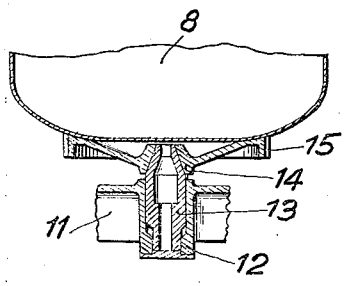
Fig. 6 shows in a vertical section a detail of the trough.
Figure 5:
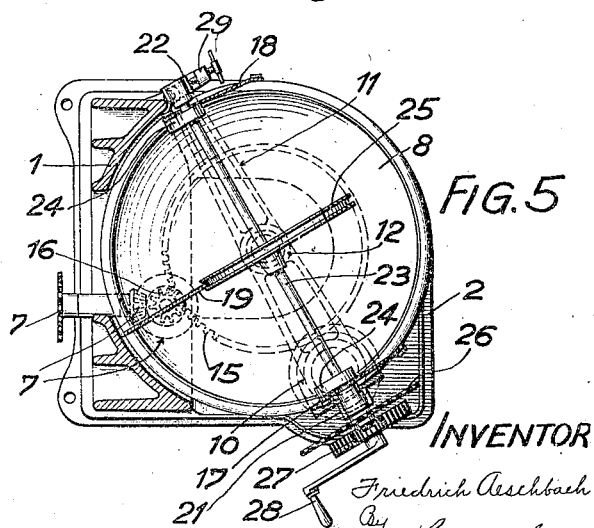
Fig. 5 is a plan view of Fig. 4 with the machine frame shown in section.

In the drawings 1 denotes the machine frame having a plate 2. 3 is the electric motor which drives in a known manner by transmission means 4 the kneading arms 5 and 6 and the transmission means 7 for rotating the trough 8 when the latter is in its working position shown in Figs. 4 and 5.

In the bed plate 2 of the machine frame a vertical pin 9 is provided on which an arm 11 is turnable with its bearing 10 cooperating with the pin 9. In the arm 11 a vertical bearing 12 is provided in which a vertical pin 13 is arranged which is conical in its upper part, and the trough 8 is provided with a bearing 14 cooperating with the conical part of the pin 13. 15 designates a spur gear wheel rigidly fixed to the trough 8 and with which the pinion 16 of the transmission means 7 cooperates when the trough is in its working position.

Figure 1:
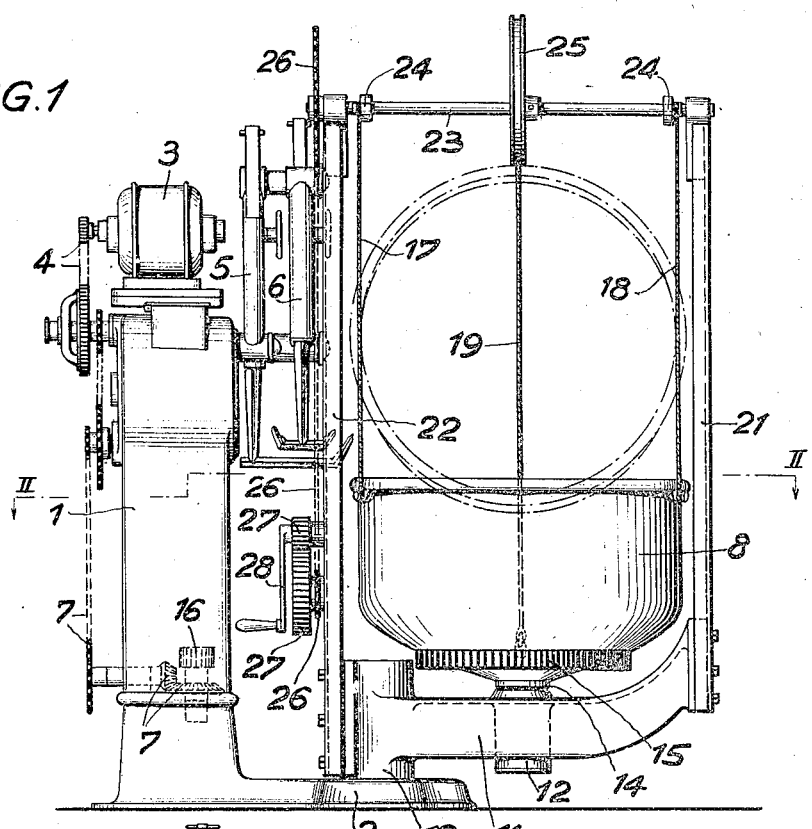
Fig. 1 shows in a side elevation the kneading machine with the arm carrying the trough swung away from the other parts of the machine.
Figure 2:
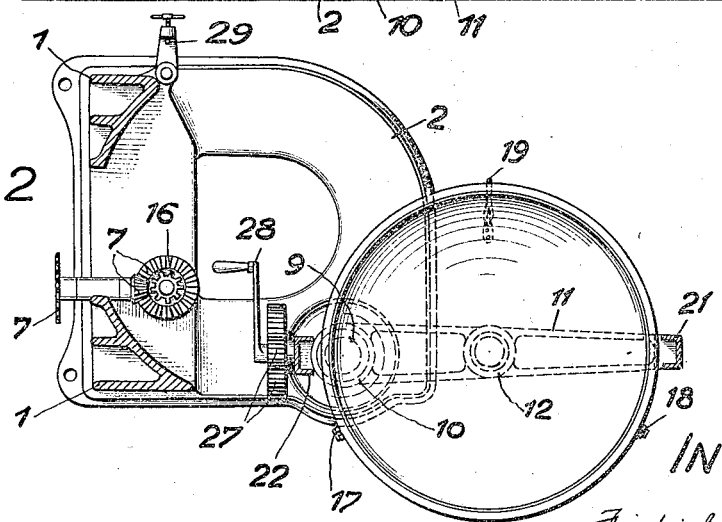
Fig. 2 is a horizontal section along line II—II in Fig. 1.
Figure 3:
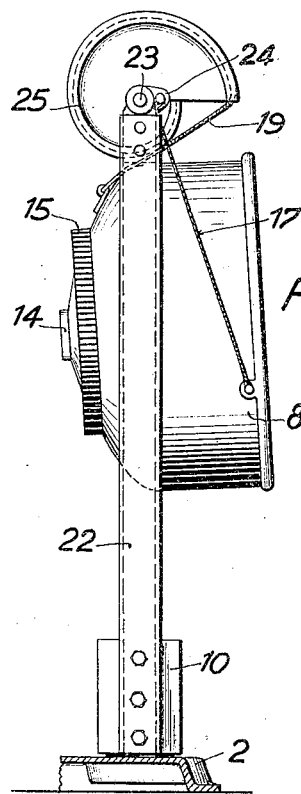
Fig. 3 shows in a side view the lifting and tilting device with the lifted and tilted trough.

Three ropes 17, 18 and 19 cooperate with the trough 8 and serve for lifting the latter. The ropes 17 and 18 are removably attached near the upper edge of the trough to the latter, whilst the rope 19 is removably fixed to an eyelet 20 on the lower part of the trough. Vertical columns 21 and 22 are fixed to facings provided on the arm 11 and on the bearing 10 of the latter respectively, and a horizontal shaft 23 is rotatably mounted in the top part of these columns. The shaft 23 carries two cranks 24 to which the other ends of the ropes 17 and 18 are fixed. Further a disk 25 having a spiral shaped circumference on which the rope 19 is wound is fixed to the shaft 23. A chain drive 26 and a spur wheel gear 27 are operable by a crank 28 for turning the shaft 23. By turning the crank 28 the trough 8 is lifted from the position shown in Fig. 4 into the position shown in Fig. 3 and simultaneously tilted as the rope 19 which is wound on the spiral disk 25 is more shortened than the ropes 17 and 18. Thus in order to tilt the trough 8 the arm 11 is first swung into the position shown in Figs. 1 and 2 after the locking device 29, which secures the arm 11 and the trough 8 in the operative position, has been unlocked and then the crank 28 is turned in one direction. In order to lower the trough 8 the crank 28 is turned in the opposite direction whereby it is tilted back and lowered until it rests on the pin 13 of the arm 12 and then this arm is swung towards the machine frame and secured in its position by means of the locking device 29.

I claim:

1. In a dough kneading machine, in combination, a machine frame, an arm swingable about a vertical axis relatively to said frame, a kneading trough rotatably mounted on said arm, and means for lifting and tilting said trough, said means being fixed to said arm and swingable with the latter.

2. In a dough kneading machine, in combination, a machine frame, a vertical pin rigidly fixed to said machine frame, an arm swingable about said vertical pin, a kneading trough rotatably mounted on said arm, and means for lifting and tilting said trough fixed to said arm and swingable with the latter.

3. In a dough kneading machine, in combination, a machine frame, an arm swingable about a vertical axis relatively to said frame, a kneading trough rotatably mounted on said arm, two vertical columns rigidly fixed to said arm, a horizontal shaft mounted on said columns, two cranks and a disk with a spiral shaped circumference fixed on said shaft, three ropes fixed with their one ends to the trough and with their other ends to said cranks and disk to be wound on the latter, and means to turn said shaft for lifting and tilting the trough.

In testimony whereof I have signed my name to this specification.

FRIEDRICH AESCHBACH.